(12) United States Patent
Holtslag et al.

(10) Patent No.: US 7,929,394 B1
(45) Date of Patent: Apr. 19, 2011

(54) 1033MULTIPLANE INFORMATION STORAGE SYSTEM AND RECORD CARRIER FOR USE IN SUCH A SYSTEM

(75) Inventors: Antonius H. M. Holtslag, Eindhoven (NL); Derk Visser, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/442,959

(22) Filed: Nov. 18, 1999

Related U.S. Application Data

(63) Continuation of application No. 09/159,994, filed on Sep. 24, 1998, now Pat. No. 6,026,069, which is a continuation of application No. 08/791,097, filed on Jan. 23, 1997, now Pat. No. 5,864,530, which is a continuation of application No. 08/487,615, filed on Jun. 7, 1995, now abandoned, which is a continuation-in-part of application No. 08/175,331, filed on Dec. 9, 1993, now Pat. No. 5,511,057.

(30) Foreign Application Priority Data

Jan. 4, 1993 (EP) ...................................... 93200001

(51) Int. Cl.
*G11B 7/00* (2006.01)

(52) U.S. Cl. .............................. 369/94; 369/54; 369/112
(58) Field of Classification Search ................... 369/94, 369/93, 103, 106, 109, 112, 44.26, 44.32, 369/47, 48, 54, 58, 116
See application file for complete search history.

(56) References Cited

U.S. PATENT DOCUMENTS

| | | | | | |
|---|---|---|---|---|---|
| 5,251,198 | A | * | 10/1993 | Strickler | 369/94 X |
| 5,263,011 | A | * | 11/1993 | Maeda et al. | 369/94 X |
| 5,446,723 | A | * | 8/1995 | Best et al. | 369/94 X |

* cited by examiner

*Primary Examiner* — Muhammad Edun

(57) ABSTRACT

An information storage system is described which comprises a reading device (6) and an optical record carrier (5) having at least two information planes (1, 2, 3). The radiation from the record carrier is converted in a detection system (15) into a detection signal (16) which is applied to a detection circuit (17). In order that this circuit can derive the read information from the detection signal in a reliable manner, the interference signals generated by the information planes which are not to be read should comply with a requirement, referred to as the interference requirement, which is characteristic of the detection circuit. Values for the parameters of the record carrier, such as the thickness of the layers between the information planes and the reflection and transmission coefficients of the information planes then follow from this interference requirement.

4 Claims, 5 Drawing Sheets

1033MULTIPLANE INFORMATION STORAGE SYSTEM AND RECORD CARRIER FOR USE IN SUCH A SYSTEM

CROSS REFERENCE TO RELATED APPLICATIONS

This is a Continuation of application Ser. No. 09/159,994, filed Sep. 24, 1998 now U.S. Pat. No. 6,026,069, which is a Continuation of application Ser. No. 08/791,097, filed Jan. 23, 1997 now U.S. Pat. No. 5,864,530 which is a Continuation of application Ser. No. 08/487,615 now abandoned, filed Jun. 7, 1995; which is a Continuation-in-Part of application Ser. No. 08/175,331, filed Dec. 9, 1993 now U.S. Pat. No. 5,511,057.

The invention relates to an information storage system comprising an optical record carrier having at least two information planes, and a reading device for scanning the information planes from one side of the record carrier, said device comprising a first optical system for forming a radiation spot on an information plane to be read, a second optical system for passing radiation from the record carrier to a radiation-sensitive detection system which converts the radiation into an electric detection signal, and a detection circuit electrically connected to the detection system for converting the detection signal into an information signal. The invention also relates to an optical record carrier for use in such a multiplane information storage system.

In the aim for increasing the information density in record carriers having a plurality of information planes, the distance between the information planes is to be minimized, while separate reading of the information stored in each information plane should remain possible. A first step of storing more information on a record carrier is the double-sided record carrier. i.e. a record carrier in which an information plane is present at each side. The two planes are read from different sides of the record carrier. A subsequent step is to provide two or more information planes on a record carrier, which planes can be read from one side. By securing two of these multiplane record carriers via one side, the information contents can be further increased by a factor of two.

An information storage system of the type described in the opening paragraph is known from U.S. Pat. No. 3,855,426. The reading device of the storage system focuses a radiation beam on one of the information planes of the record carrier. The information is stored in information areas, or marks in the information planes. The radiation passed by the record carrier is modulated by the marks and is received by a lens which forms an image of the area of the information plane to be currently read on a radiation detection system. The detection system converts the modulation of the incident radiation into an information signal. If the radiation beam is focused on an information plane, it will also illuminate an area on a different, higher- or lower information plane. This area or parasitic area whose illumination is unwanted should be so large and contain so many marks that the influence of the separate marks on the desired reading signal is averaged. The average influence of the marks in the parasitic area on the information signal will then be no more than a reduction of the modulation depth of the information signal generated by the interaction of the radiation beam with the marks in the plane to be read. To achieve this effect, the distance between the information planes in the known record carrier is taken to be larger than 10 μm, dependent on the numerical aperture of the objective system.

Said U.S. Pat. No. 3,855,426 does not state the requirements to be satisfied by the reading device and the record carrier in order that the reading device can derive the information stored in an information plane to be read with sufficient reliability from the radiation originating from the record carrier. Knowledge of these requirements is of great importance due to the trend of increasing the information density in record carriers and the related wish of positioning the information planes closer together so that there is a greater risk of crosstalk between the information planes while the reading device becomes more critical.

It is an object of the present invention to provide an information storage system in which a maximum information density is achieved by mutual adaptation of the requirements imposed on the reading device and the record carrier, which storage system is based on newly gained insights into the importance and influence of given system parameters on the information signal which is ultimately obtained.

The information storage system according to the invention is characterized in that the distances between the information planes and the optical properties of the information planes are such that the information storage system complies with the interference requirement, i.e. the ratio between the sum of interference signals in the detection signal generated by the information planes not to be read and a read signal in the detection signal generated by the information plane to be read is smaller than an interference ratio Q determined by the detection circuit.

It has been found that the critical parameter of the reading device is the maximum interference ratio, i.e. the ratio between the strength of the interference signals and the desired read signal in the detection signal, at which ratio the detection circuit is still just capable of deriving the information from the detection signal with a reliability which is sufficient for a particular read action of the system. At a given strength of the desired read signal the maximum interference ratio imposes an upper limit on the allowed strength of the interference signals. If the interference signals exceed the upper limit, the generation of the information signal from the detection signal will be influenced by the interference signals and the detection circuit will no longer supply reliable information. The interference signals may be caused, inter alia, by fluctuations in the power of the radiation beam supplied by the radiation source, scattered light in the optical system of the reading device, roughness of the information plane to be read. The information planes not to be read also produce interference signals because they also send radiation from the read beam to the detection system. When the reading device is designed, the total budget for the interference signals is distributed over the various sources of interference. A part of the budget should therefore be allocated to the interference signals originating from the information planes which are not to be read. This part of the budget corresponds to the interference ratio Q. If the information storage system complies with the interference requirement, i.e. if the interference ratio being the quotient of the interference signals caused by the information planes not to be read and the read signal is smaller than Q, the information will be read in a reliable manner, assuming that the strength of interference signals from other sources remains within the part of the budget allocated to these signals. By making use of the novel notion of interference requirement, it will be possible to attune the reading device and the record carrier to each other in an optimum way. When the record carrier is designed, the parameters such as the distance between the information planes, the reflection and transmission of the information planes and the extent to which the marks of the separate information planes modulate the incident radiation should be chosen in such a way that the interference requirement is satisfied. The maximum information density in the record carrier in the direction perpendicular to this carrier and in the plane of the information plane is achieved if the interference ratio is equal to Q.

A special embodiment of the information storage system according to the invention is characterized in that the interference requirement is defined by $$\frac{\sum_{j \neq i} E_j \sum_f m_j(f) MTF(f, d_j/n)}{E_i \sum_f m_i(f) MTF(f, 0)} < Q,$$

in which the summation over j is over all information planes not being the information plane i to be read, and the summation over f is over the frequencies present in the signal received from an information plane. while $E_j$ is the optical power of the radiation from information plane j, $m_j(f)$ is the modulation factor at frequency f of the information plane j, in which $m_j(f)$ for an information plane not to be read is determined with the radiation beam focused on plane j, and in which further $MTF(f,d_j/n)$ is the modulation transfer function at the frequency f of the radiation originating from the information plane j to the detection signal, $d_j$ is the distance between the information plane j and the information plane i to be read, and n is the refractive index of the medium between the information planes i and j.

A special embodiment of the information storage system according to the invention, in which the correct functioning of the detection circuit is not dependent on the sum of the amplitudes of the electrical interferences signals but on the sum of the powers of the interference signals, is characterized in that the interference requirement is defined by $$\frac{\left(\sum_{j \neq i}\left(\sum_f E_j m_j(f) MTF(f, d_j/n)\right)^2\right)^{\frac{1}{2}}}{\sum_f E_i m_i(f) MTF(f, 0)} < Q.$$

For detection circuits which are sensitive to the DC component of the detection signal, the interference signals of zero frequency should be taken into account. In such detection circuits the sensitivity to DC interference signals may be different than for AC interference signals so that there is both an AC value and a DC value for Q. In the design of the record carrier two interference requirements should therefore be taken into account, i.e. the interference requirement for the AC interference signals with the AC value for Q and the interference requirement for the DC interference signals with f=0, $m_i=m_j=1$ and the DC value for Q.

If the distance between the information planes is small as compared with the depth of field of the objective system, the amplitude addition of radiation of neighbouring information planes should be taken into account when the value of $E_j$ is determined. At larger distances the radiation of neighbouring information planes should be added in power.

If a record carrier has three information planes 1, 2 and 3, in which plane 1 is closest to the objective system and plane 3 is read in reflection, a part of the radiation focused on plane 3 will be reflected from plane 2. At equal distances between the three planes, this reflected radiation will focus on plane 1 and after reflection from plane 1 and reflection again from plane 2, it will be passed towards the detection system. Due to these reflections from plane 2 an unexpectedly large interference signal is generated by plane 1. An information storage system according to the invention, which can be optimized for such a large interference signal, is characterized in that the record carrier has at least three information planes and in that the sum in said interference requirement includes imaginary information planes each constituted by mirroring an information plane with respect to another information plane. The interference requirement can be satisfied by a correct choice of distances between the planes and/or reflection coefficients of the planes.

A special embodiment of the information storage system according to the invention is characterized in that a first information plane has an information structure which is optimally read in a first read mode, and at least a second information plane has an information structure which is optimally read in a second read mode, in that the reading device has the disposal of both read modi and in that the parameters $E_j$, $m_j$ and MTF ($f,d_j/n$) in the interference requirement for an information plane which is not to be read have those values which are associated with the read mode in which the information plane i to be read is read.

Let it be assumed that the record carrier has two information planes in which the information in the first information plane is stored in a first information structure, for example in magnetic domains, which structure must be read in a so-called differential mode, and in which the information in the second information plane is stored in a second information structure, for example in pits, which structure must be read in a so-called central aperture mode. When the first information plane is being read, the detection signal is generated by the detection system operating in the differential mode. To determine the interference in the generated read signal, the value of the interference signals of the second information plane must also be determined by means of the detection system in the differential mode instead of in the central aperture mode.

The different read modi can be realised in several manners. A first embodiment of the reading device of the information storage system using two read modi is characterized in that the radiation source is adapted to supply a radiation beam having a first wavelength in the first read mode and a radiation beam having a second wavelength in the second read mode. By giving the information planes different properties for the two wavelengths, it is possible to further reduce the interference signals.

A second embodiment of the reading device of the information storage system using two read modi is characterized in that the detection system has the disposal of two detection modi for detecting, in the first and the second read mode, the radiation from the record carrier in the first and the second detection mode, respectively. Detection in several modi provides the possibility of efficiently converting the radiation from an information plane to be read into a read signal, and of suppressing the interference signals which are generated by the radiation from other information planes in which the information is stored in a different manner.

A special embodiment of the information storage system according to the invention, in which the information planes are read in reflection, is characterized in that the radiation intensity reflection coefficients of the successive information planes are defined by $$R_{j+1} = \frac{R_j}{T_j^2}.$$

with an increasing distance of the objective system.

Each information plane to be read then supplies an equal amount of radiation to the detection system so that the detection circuit of each information plane receives an equally large detection signal. Consequently, varying values of the detection signal need not be taken into account in the detection circuit, which simplifies the construction of this circuit.

These and other aspects of the invention will be apparent from and elucidated with reference to the embodiments described hereinafter.

In the drawings

Figure 3A:
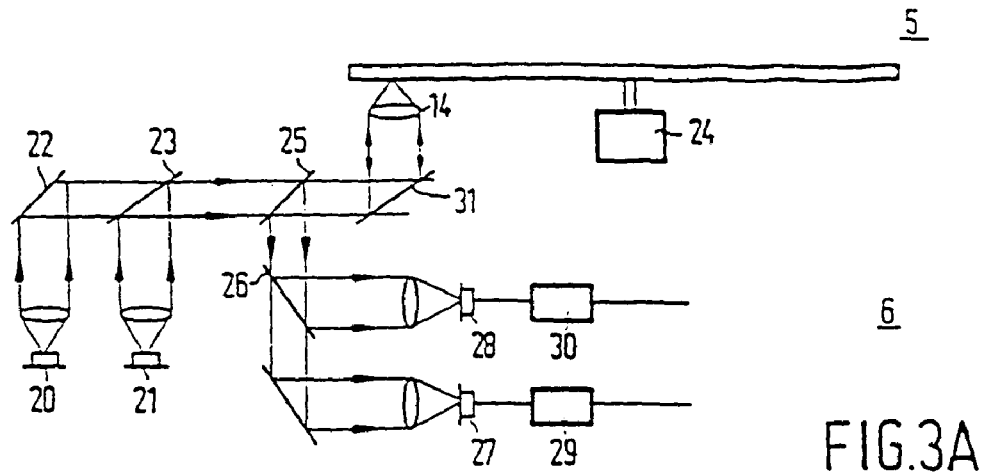
FIG. 3A shows an information storage system operating at two wavelengths.
Figure 3B:
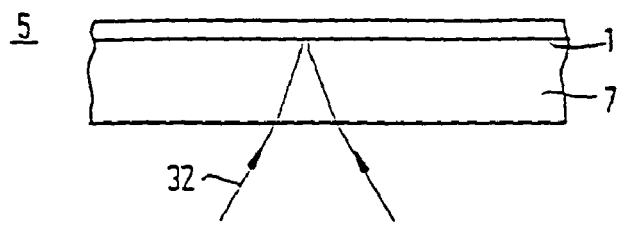
Figure 3C:
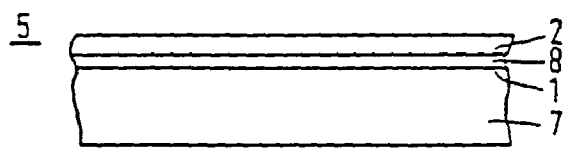
Figure 3D:
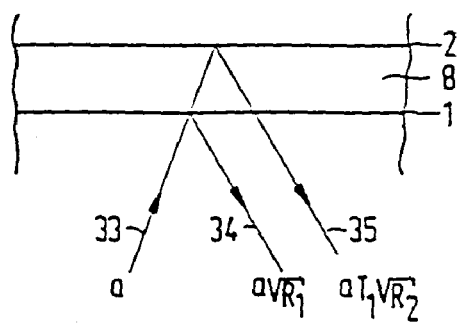
Figure 4A:
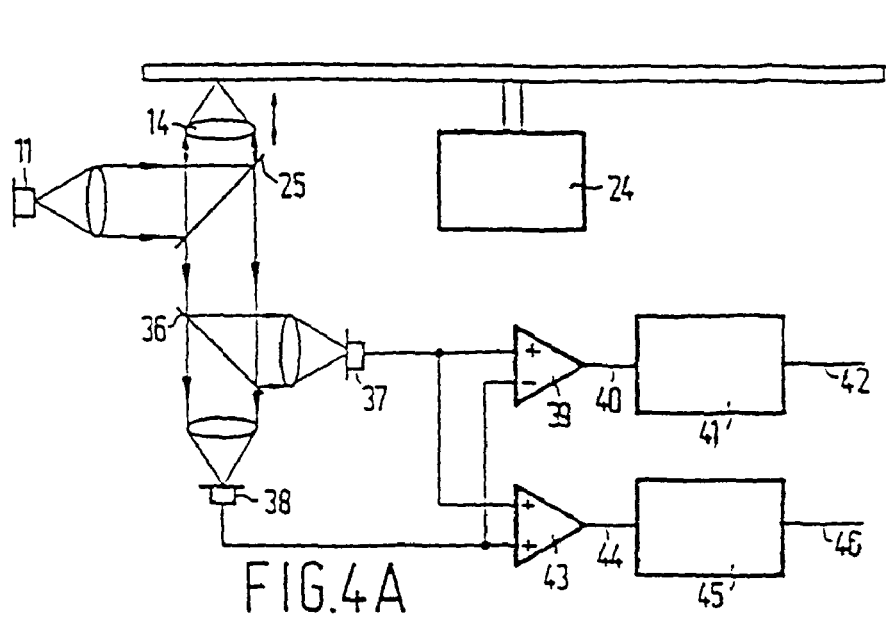
Figure 4B:
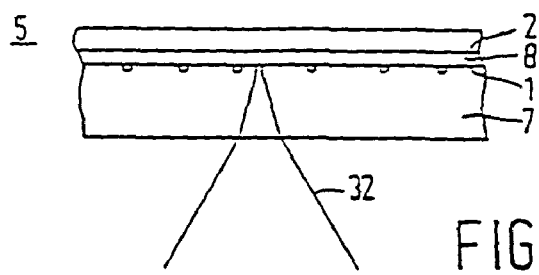
Figure 5A:
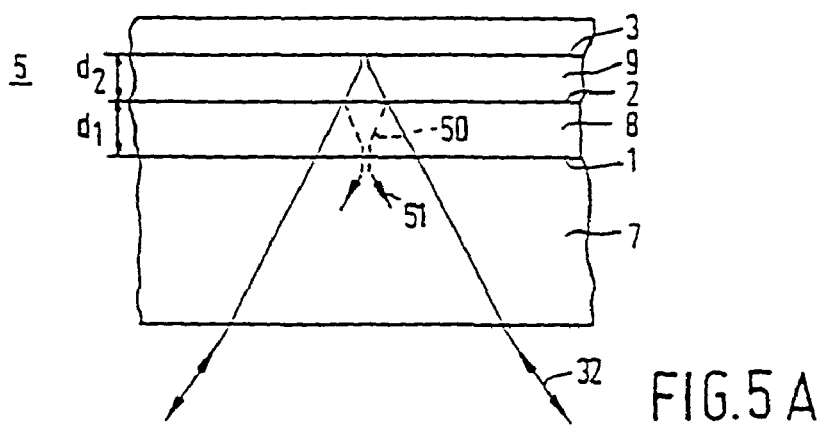
Figure 5B:
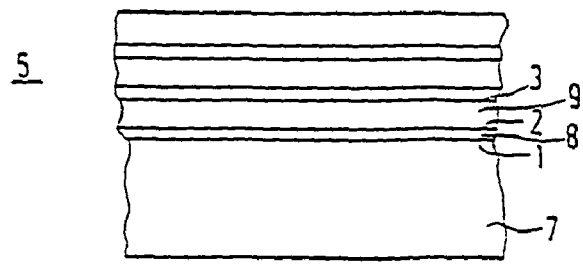
Figure 6:
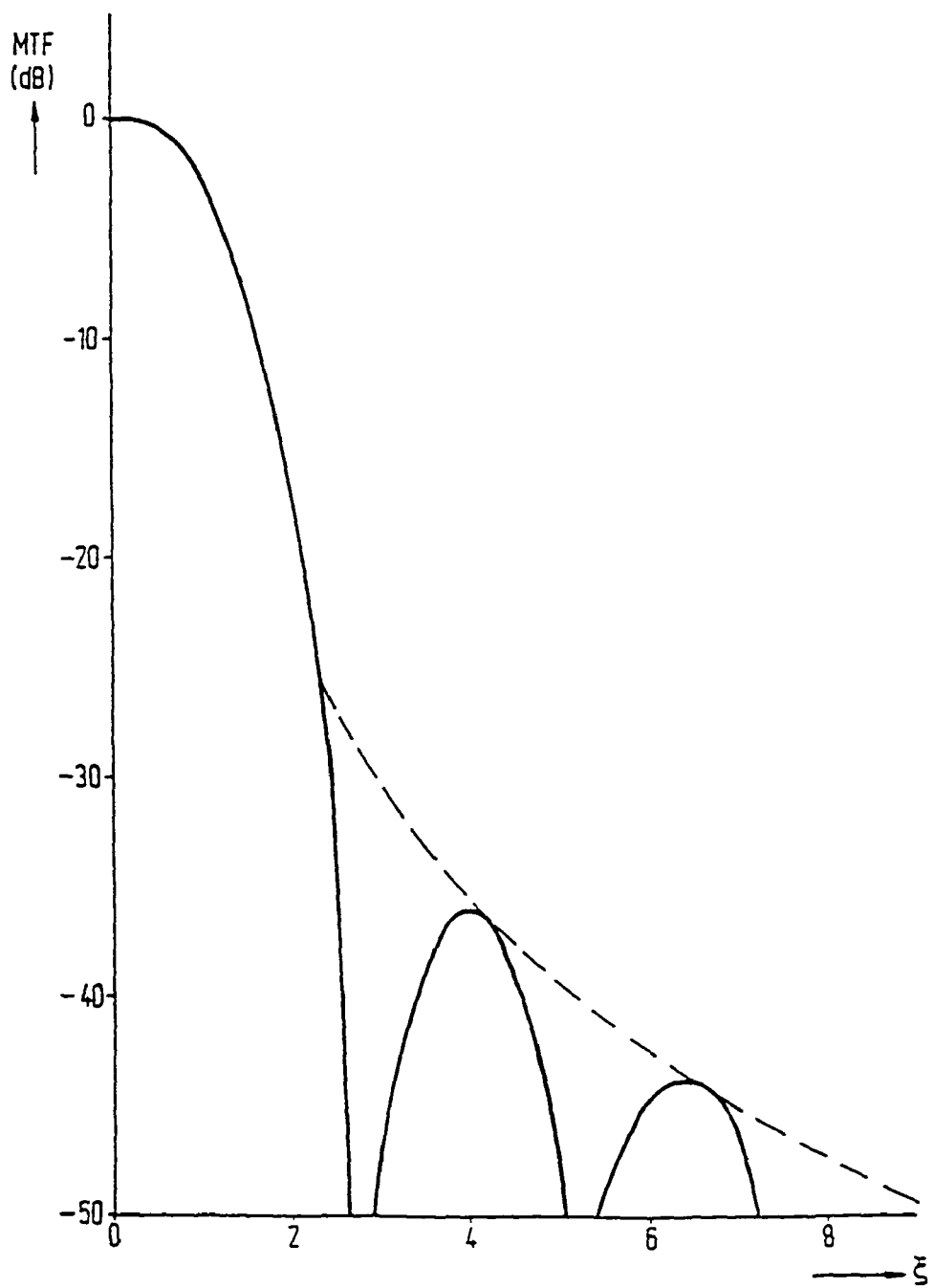
Figure 7A:
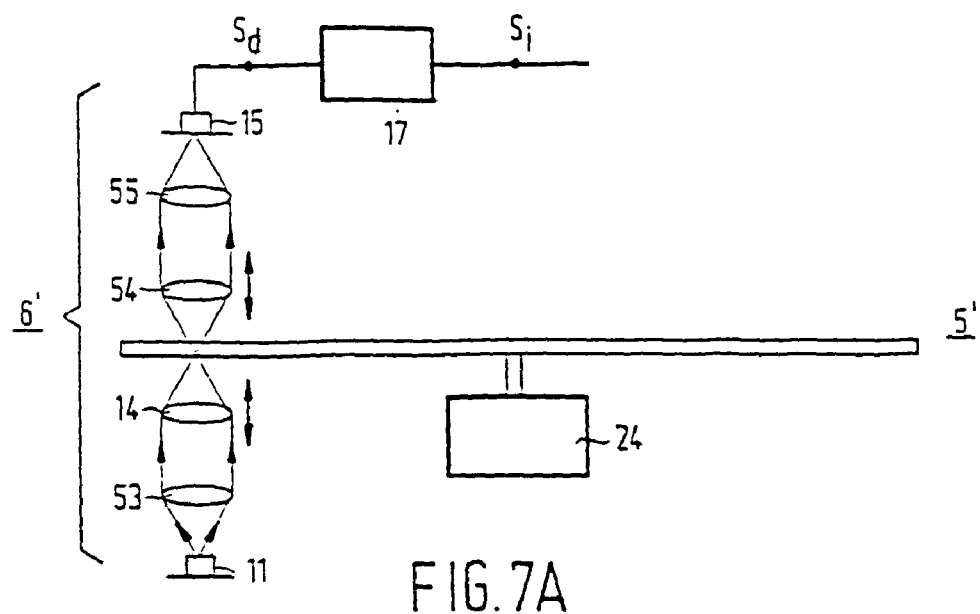
Figure 7B:
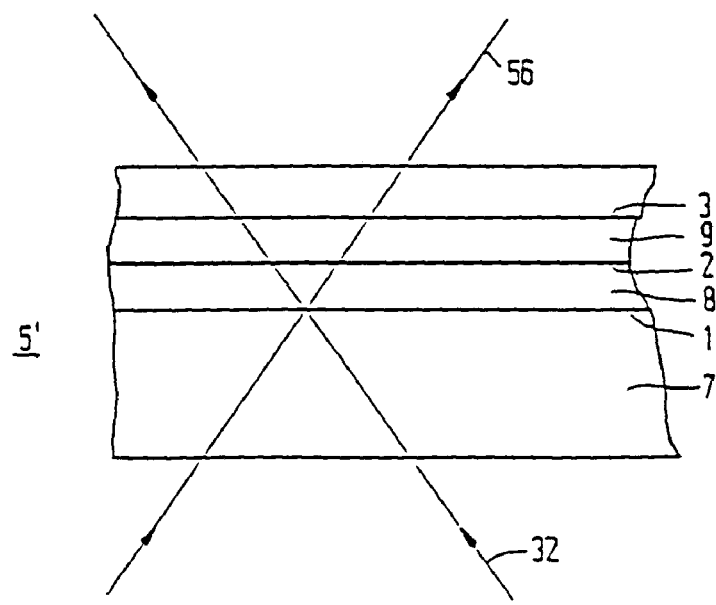

FIG. 3B shows an associated record carrier having two information planes in one layer, FIG. 3C shows an associated record carrier having two separate information planes, FIG. 3D is a magnification of the two information planes of FIG. 3C, FIG. 4A shows an information storage system in which marks in the form of pits and domains are used, FIG. 4B is a cross-section of a record carrier having two information planes used in this system, FIG. 5A shows a record carrier having three information planes, FIG. 5B shows a record carrier having intermediate layers with different thicknesses, FIG. 6 shows the variation of the modulation transfer function as a function of the normalized distance between the focal plane and the information plane upon reading in reflection, FIG. 7A shows an information storage system in which the signals are read in transmission, and FIG. 7B is a cross-section of the record carrier of FIG. 7A.

Tables 1A, B, C contain a copy of numbered mathematical formulae of the Figure description.

Figure 1:
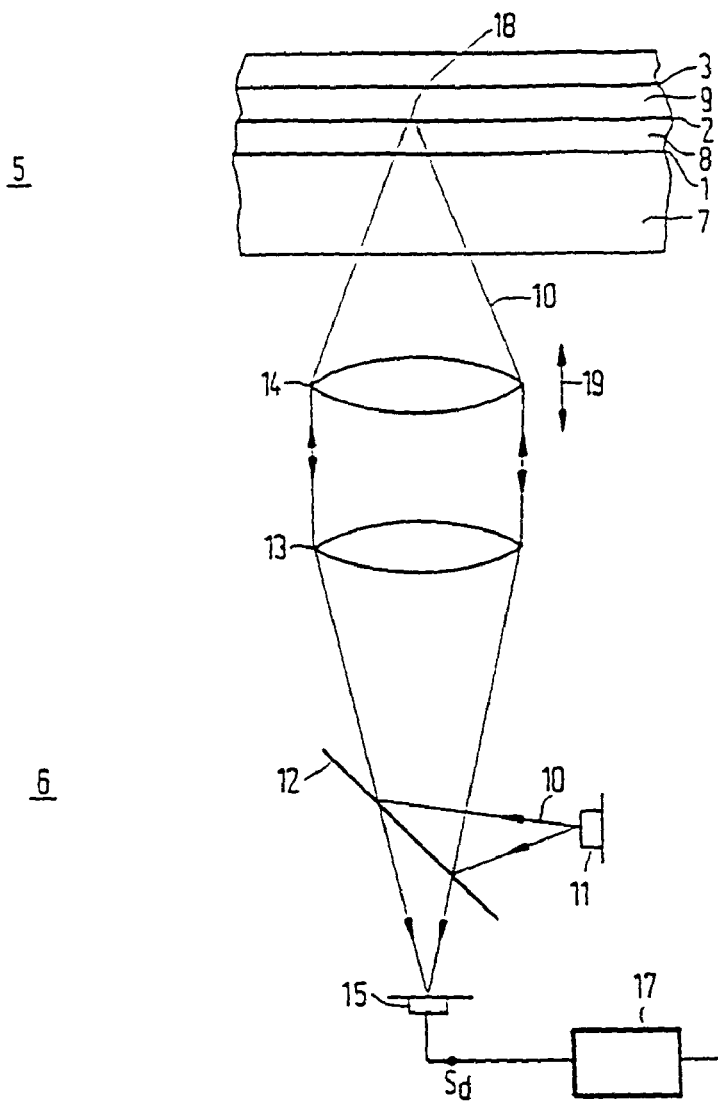
FIG. 1 shows an information storage system.

FIG. 1 shows diagrammatically an information storage system comprising a record carrier 5 and a reading device 6. The record carrier, part of which is shown in a cross-section in FIG. 1, comprises a transparent substrate 7 which is provided with three information planes 1, 2 and 3 separated by intermediate layers 8 and 9. An information plane may comprise a single interface between two media with different optical properties, or one or more layers between two media. The information is recorded in the information planes in marks which are not shown in the Figure. The marks may be arranged in parallel tracks. The marks may be, for example pits or domains magnetized in a given direction, or areas having a reflection coefficient which deviates from their surroundings. The information stored in the information'planes is read by means of the reading device 6 in which a radiation beam 10 is generated by a radiation source 11, for example a semiconductor laser. The radiation beam travels from the source to the information plane via a first optical system. The optical system comprises a beam splitter 12, for example a partially reflecting mirror, a collimator lens 13 and an objective system 14 shown in the Figure as a single lens which focuses the beam to a spot 18 on the information plane 1, 2 or 3 to be read. The spot 18 of the reading device may be located on any desired information plane, for example, by moving the objective system 14 along the optical axis, as is denoted by means of the arrow 19 in FIG. 1. By moving the spot 18 and the record carrier with respect to each other in a plane parallel to the record carrier, any information plane can be scanned. The radiation reflected by the relevant information plane is then modulated by the marks in this information plane. This radiation is guided to a detection system 15 via a second optical system, comprising the objective lens 14, the collimator lens 13 and the beam splitter 12. The detection system converts the incident radiation into an electric detection signal $S_d$ whose modulation is related to the modulation of the radiation beam. A detection circuit 17 derives an information signal $S_i$ from the detection signal, which information signal represents the information read.

Figure 2:
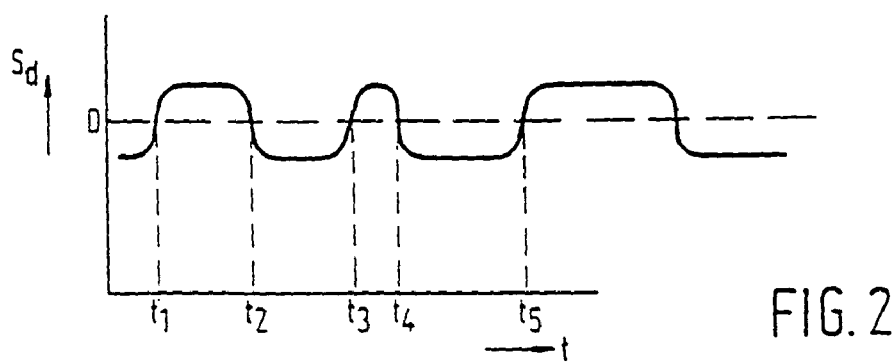
FIG. 2 shows the variation of a detection signal as a function of time.

In many cases the incoming detection signal is compared with a given detection level in the detection circuit in order to convert the analog detection signal to a digital information signal. FIG. 2 shows by way of example a particular detection signal $S_d$ as a function of time t. The detection level D is indicated by means of a broken line. The detection circuit 17 reconstructs the information signal $S_i$ by using the instants $t_1$, $t_2$, $t_3$, etc., at which the value of the detection signal is equally large as that of the detection level.

In addition to the read signal originating from the currently read information plane, the detection signal also comprises interference signals, which may give rise to shifts of said instants. If the sum of all interference signals exceed a given strength or power, the shifts will lead to a decrease of the quality of the information signal $S_i$. If the stored information is a video program, said shifts will lead to a noticeable deterioration of the quality of the picture; in the case of information in the form of digital data the shifts lead to errors in the information signal whose allowed number is dependent on the use of the information storage system. Consequently, for each reading device an upper limit is to be imposed on the interference signals. If the sum of the interference signals in the detection signal $S_d$ remains below the limit value, the detection circuit can supply a reliable information signal $S_i$. The interference signals in the reading device are produced, inter alia, by fluctuations in the power of the radiation beam 10 supplied by the radiation source 11, scattered light produced in the optical system of the reading device, and roughness of the information plane to be read. The designer of the information storage system will allocate a part of the maximum allowed interference signal budget to each possible interference signal source. A part of the budget should be allocated to the interference signals which are produced because the information planes located proximate to the information plane to be read also direct radiation towards the detection system 15. The maximum value of these interference signals is represented for each multiplane information storage system by a new parameter for the record carrier, the value of which parameter is determined by the detection circuit 17. This parameter is the interference ratio Q, i.e. the ratio of the maximum interference signal from all information planes not to be read currently and referred to as interference planes, and the read signal of the information plane to be read currently. The ratio of the maximum electric power in the interference signals and the electric power in the read signal is equal to $Q^2$.

For a correct operation of the detection circuit it is necessary that the record carrier satisfies the following interference requirement: the ratio between the interference signal generated by the interference planes and the read signal should be smaller than Q. The value of Q is determined, inter alia, by the way of generating the detection signal in the detection system 15, the possible presence of correction filters for improving the detection signal, the way in which the information signal in the detection circuit 17 is derived from the detection signal, and the requirements which are imposed on the information signal. The safety margins within an allocated part of the maximum allowed interference signal budget should also be taken into account. Some systems may have several values for Q, one value for each type of information. One type of information is user data with essentially a random character. Another type is address information used for labelling region on an information plane; such information has comparable contents in neighbouring tracks and in neighbouring information planes. A third type of information is tracking information used for guiding the spot 18 along the tracks. The type of information giving the strictest interference requirement determines the design parameters of the record carrier. Although examples below deal with random information, the interference requirements for other types of information can be derived in an analogous way.

If the information is stored in the carrier in a digital form, it is possible to store error-correction information with it. The error-correction information can be used in the detection circuit to correct errors in the information signal. A larger amount of error-correction information allows correction of larger errors, lowering the quality requirements of the detection signal. Hence, a detection circuit with a great error-correction capability will have a relatively large value of Q, as it can cope with large interference signals. The value of Q will hereinafter be considered as a factor fixed by the reading device. The interference signals referred to hereinafter are interference signals generated by interference planes, unless otherwise stated.

The value of Q should be taken from the design of the information storage system. In case this value is not known for a system, an approximate value can be obtained in the following way. The modulation of the detection signal $S_d$ must be measured when the reading device reads an optical record carrier with only one information plane. The quality of the record carrier should be the minimum quality allowed by the specification of the system, such that the part of the budget allocated to the interference signals not related to interference planes is fully used. The remaining part of the budget is then for the interference signals generated by the interference planes of multiplane record carriers. The magnitude of this part can be determined by adding a signal with a controlled modulation to the detection signal $S_d$. This modulation must be increased until the system reaches a minimum performance level. The ratio of the controlled modulation and the modulation due to the single-plane record carrier is now an approximate value for the parameter Q.

When the radiation beam is focused on an information plane, it illuminates an area on this plane, which area is referred to as the spot 18. The sizes of the marks and the spot are generally, but not necessarily of the same order of magnitude. The presence of the marks influences the beams transmitted and reflected by the information plane. If the radiation beam and the record carrier move with respect to each other, so that the spot scans the information plane, said beams will be modulated by the marks. In the system shown in FIG. 1 the reflected beam is passed towards the detection system of the reading device. In a comparable manner, the transmitted beam can be detected by means of a detection system arranged above the record carrier. It will hereinafter be assumed by way of example that the information is stored in the form of marks and intermediate lands, arranged in tracks scanned by the spot. The direction parallel to the tracks is referred to as the tangential direction and the direction perpendicular to the tracks and in the information plane is referred to as the radial direction. Although this nomenclature refers to a disc-shaped record carrier, the invention is not limited to this, but includes record carriers of all shapes, such as optical cards. Upon reflection of the radiation beam on the information plane, a part of the incident radiation will be diffracted by the marks. Diffraction beams of the first and higher orders are produced, which beams leave the information plane in other directions than the non-diffracted zero-order beam. The angle between the higher-order diffraction beams in the tangential direction and the zero-order beam is a measure of the local period in this direction of the structure of successive marks and lands. The power of a higher-order diffraction beam in a given direction is determined by the number of marks present in the read track with a period between them associated with the deflection angle of the beam, and by the size of these marks and the contrast between the marks and their surroundings. In other words, the diffraction beams in the tangential direction constitute a one-dimensional Fourier transform of the marks in the track and represent the contents of the stored information in terms of spatial frequencies. The higher-order diffraction beams cannot only be distinguished from the zero-order beam in their direction of propagation and power, but also in their phase or state of polarization, dependent on the properties of the marks.

The zero-order and higher-order diffraction beams are passed through an optical system comprising the objective system 14, the collimator lens 13 and the beam splitter 12 to the detection system 15. In an information structure comprising marks having a reflection coefficient different from their surroundings, the radiation portions of the zero-order and higher-order beams incident on the detection system will interfere with each other. The DC value of the amplitude of the generated electric detection signal is proportional to the power in the zero-order beam, while generally its AC value is proportional in a good approximation to the product of the amplitude of the zero-order beam and the amplitude of the higher-order diffraction beams, as is known, inter alia from the book "Principles of Optical Disc Systems" by G. Bouwhuis et al (Hilger, 1985), chapter 2. This chapter describes how the detection signal can be calculated from the power in the diffraction beams. If the optical power, i.e. the square value of the amplitude, of the zero-order beam originating from information plane i is represented by $E_i$, the DC value of the amplitude of the associated detection signal is proportional to $E_i$. The AC value of the amplitude is proportional to $E_1 m_1(f)$ in which the modulation factor $m_i$ is proportional to the ratio of the amplitude of the higher-order diffraction beams and the amplitude of the zero-order beam. The parameter f is the frequency of the detection signal. It indicates the frequency dependence of the modulation factor, i.e. the dependence on the information contents of the track which has been read. A part of the radiation in the higher-order beams will not be received by the detection system, because the large deflection angle of these beams will cause a part of them to fall outside the objective system and to get lost. The larger the angle between the first-order diffraction beam and the zero-order beam, the larger the part falling outside the objective system. The resultant loss of power of the detection signal is expressed in the modulation transfer function MTF (f). Due to the movement of the marks in the track with respect to the spot, the spatial frequency of the tracks is converted into a temporal frequency of the detection signal. The read signal $S_r$, i.e. the part of the detection signal $S_d$ produced when the marks in the track to be read are scanned can now be written as:

$$S_r = C \sum_f E_i m_i(f) MTF(f), \tag{1}$$

in which C is a detection constant for the conversion from optical radiation to electric signal, and $m_i(0)=1$. The summation is over all frequencies which occur in the track to be read. If the frequencies have no discrete but a continuous distribution, the summation in equation (1) should be replaced by an integration. Although the reasoning leading to equation (1) is based on an information structure having marks of different reflection coefficients, the read signal of each information structure can be written in the form of equation (1). The modulation factor $m_i$ is dependent on the properties of the information structure, hence on the properties of the diffraction beams such as the relative power of the beams, mutual phase relation and state of polarization, and on the way in which the radiation in the detection system 15 is converted into an electric detection signal. The modulation transfer function MTF is dependent on the properties of the optical system with which the radiation is focused on the information plane, and on the optical system with which the radiation from the information plane is passed towards the detection system, i.e. of the collimator lens 13 and the objective system 14 in the reading device shown in FIG. 1.

Information planes which are not to be read currently and which are located in the radiation path of the scanning beam also direct radiation towards the detection system and will thus each provide a contribution in the form of an interference signal to the detection signal $S_d$. Each of these interference signals can be expressed in an analogous manner as has been done in equation (1) for the read signal $S_r$. The sum of these interference signals from the information planes which are not to be read gives the total interference signal. The interference requirement for reading information plane i can now be written as:

$$\frac{\sum_{j \neq i} \sum_f E_j m_j(f) \, MTF(f, d_j/n)}{\sum_f E_i m_i(f) \, MTF(f, 0)} < Q. \tag{2a}$$

In this formula $m_j(f)$ is the modulation factor of an information plane j if the radiation beam is focused on plane j, while $E_j$ is the power of the radiation from the information plane j if the radiation beam is focused on the information plane i to be read. The modulation transfer function MTF for an information plane not to be read, which is also called an interference plane, will often be different from the modulation transfer function of the information plane to be read. This is particularly the case if the spot is not located on the interference plane. With an increasing defocusing of the interference plane, the value of the transfer function of this plane decreases rapidly. This defocusing dependence is indicated by means of the parameter $d_j/n$ in equation (1), in which $d_j$ is the distance between an interference plane j and the information plane i to be read on which the radiation beam is focused, and n is the refractive index of the intermediate layer between the planes i and j. If there are layers of different refractive indices between the information planes, the value of $d_j/n$ should be determined for these layers together.

In the enumerator of the interference requirement (2a) the optical powers of the radiation of the different interference planes are added together. Since an optical power is converted into an electric amplitude in the detection system 15, the addition of the optical powers in equation (2a) will mean that the electric amplitudes of the interference signals are added together. The interference requirement (2a) therefore applies to those detection circuits 17 whose correct operation depends on the instantaneous amplitude of the interference signal. However, if the correct operation of a detection circuit depends on the average power in the interference signal, the electric powers instead of the amplitudes of the interference signals must be added together in the enumerator of the interference requirement. For such a detection circuit the interference requirement then is:

$$\frac{\left[\sum_{j \neq i} \left(\sum_f E_j m_j(f) \, MTF(f, d_j/n)\right)^2\right]^{\frac{1}{2}}}{\sum_f E_i m_i(f) \, MTF(f, 0)} < Q. \tag{2b}$$

In equations (2a) and (2b) the magnitude of the MTF should be used, as the MTF can become negative or complex when there is defocusing or aberrations.

The read and interference signals generally comprise an AC component and a DC component. Both components are incorporated in the interference requirement by taking the summations over f in equation (2a) or (2b) from zero. The DC component may result in a shift of the level of the detection signal $S_d$ in FIG. 2 with respect to the detection level D, which gives rise to a shift of the detected instants where the detection signal has the value of the detection level. The result is a decrease in reliability of the information signal. In some detection circuits the sensitivity to the DC component differs from the sensitivity to the AC component. If this is the case, the interference requirement should be split up into two requirements. The AC interference requirement is then given by equation (2a) or (2b) with the summations over f starting at a frequency of more than 0 and with Q being replaced by $Q_{AC}$. The DC interference requirement is then given by:

$$\sum_{j \neq i} \frac{E_j}{E_i} MTF(0, d_j/n) < Q_{DC}, \tag{3}$$

in which $Q_{DC}$ is the DC interference ratio of the detection circuit. The modulation factors $m_j$ and $m_i$ for the zero frequency are equal to 1, as is the modulation transfer function MTF(0,0).

To comply with the interference requirement, it will be attempted to maximally reduce the interference signals generated by information planes which are not to be read. On the other hand a maximum possible read signal is wanted during reading of an information plane to ensure satisfactory operation of the detection circuit. A larger read signal has the advantage that there will be relatively less noise in the read signal so that the information signal can more easily be derived from the detection signal. This provides the possibility of increasing the quantity of information read per unit of time or increasing the information density of the information plane. However, a decrease of the interference signal generated by an information plane often also leads to a decrease of the read signal when this information plane is being read. If the interference signal of an information plane is, for example decreased by a reduction of the modulation factor of the information plane, this will also lead to a smaller modulation of the read signal of the information plane when said information plane is being read. The parameters of the record carrier should therefore be chosen to be such that the interference requirement is just complied with. This means that each information plane to be read furnishes a maximal read signal, while the interference signals of the information planes not to be read have the maximally allowed value.

In principle, the reduction of the interference signals so as to comply with the interference requirement can be achieved by adapting each parameter in equation (2a) or (2b). For example, it is possible to suppress the quantity of detected radiation $E_j$ of an interference plane; alternatively, the modulation factor $m_j(f)$ of an interference plane can be reduced;

moreover, the modulation transfer function MTF(f, d$_j$/n) of an interference plane can be reduced. The interference requirement must be determined for reading each information plane in the record carrier. The parameter values for which each of these interference requirements is satisfied determine the structure of the record carrier. Examples of the ways in which said possibilities can be implemented in an information storage system will be given hereinafter. In most examples the influence of one interference plane on reading an information plane will be dealt with. The interference signals of possible other interference planes can be determined in an analogous manner and incorporated in the interference requirements in accordance with equation (2a) or (2b).

A first possibility of reducing the interference signals is to make use of different read modi for the information planes. To this end the information planes may have different wavelength sensitivities. A reading device based on this principle is known, inter alia from German Patent Application no. 37 41 910. FIG. 3A shows diagrammatically such a device which operates at two wavelengths. Two radiation sources 20 and 21, for example semiconductor lasers, generate radiation at wavelengths $\lambda_1$ and $\lambda_2$, respectively. The radiation beams of the two lasers are combined by means of a neutral mirror 22 and a dichroic mirror 23. The radiation beams are reflected by a mirror 31 to the objective system 14 which focuses the beams on an information plane within the record carrier 5. By rotating the record carrier by means of a motor 24, the radiation beams can scan a track of the record carrier. The radiation reflected by the record carrier is reflected by a beam splitter 25 from the on-going beam to a second dichroic mirror 26 which passes radiation having wavelength $\lambda_1$ to a detection system 27 and radiation having wavelength $\lambda_2$ to a detection system 28. The detection signal of each detection system is passed to a detection circuit 29, 30 which generates an information signal from the detection signal. The reading device of FIG. 3A provides the possibility of reading different information planes simultaneously. If simultaneous reading is not required, only one detection arm will be needed and the dichroic mirror 26, the detection system 28 and the detection circuit 30 can be dispensed with.

An embodiment of a record carrier 5 having two non-spatially separated information planes for use with the reading device of FIG. 3A is shown in FIG. 3B. The information planes constitute a single thin layer 1 on a substrate 7. A mark having a reflection coefficient different from its surroundings, mainly for the wavelength $\lambda_1$, can be written in the layer by means of a high-energetic radiation beam 32 having wavelength $\lambda_1$. This writing operation can be performed by means of a method known as the "spectral-hole burning" method. If the marks thus written are read with a radiation of wavelength $\lambda_1$, a good read signal is also obtained, while a weak read signal is obtained when these marks are read with radiation of wavelength $\lambda_2$. Conversely, a weak read signal is obtained when marks written with radiation of wavelength $\lambda_2$ are read with radiation of wavelength $\lambda_1$, whereas a good read signal is obtained when these marks are read with radiation of wavelength $\lambda_2$. The requirements with which the marks should comply follow from the interference requirement, i.e. equation (2a). On reading at a single wavelength, for example $\lambda_1$, the information plane to be read coincides with the information plane not to be read, hence $E_1=E_2$, and $d_2=0$. The modulation transfer function for radiation of wavelength $\lambda_1$ coming from the two information planes is equal for the same reason. Finally, if the two information planes comprise information of approximately the same frequency spectrum, the interference requirement for reading at wavelength $\lambda_1$ is reduced to:

$$\frac{m_2}{m_1} < Q. \tag{4}$$

The value of the modulation factor $m_j$ is dependent on the dimensions of the marks and on the difference in amplitude reflection of the mark and its surroundings, the amplitude reflection being equal to the square root of the intensity reflection. If the marks written at each of the two wavelengths have the same dimensions, the interference requirement (4) can be written as $$\left| \frac{\sqrt{R_2} - \sqrt{R}}{\sqrt{R_1} - \sqrt{R}} \right| < Q. \tag{5}$$

in which R is the intensity reflection coefficient of the information plane outside the marks, $R_1$ is the intensity reflection coefficient of a mark written with radiation of wavelength $\lambda_1$ and $R_2$ is the intensity reflection coefficient of a mark written with radiation of wavelength $\lambda_2$. In this case it has been assumed for the sake of simplicity that the intensity reflection coefficient R is equal for the two wavelengths. If the interference ratio Q for interference signals coming from information planes not to be read is taken to be 0.03, R is equal to 0.30 and $R_1$ measured at wavelength $\lambda_1$ is 0.05, then the reflection coefficient $R_2$ also measured at wavelength $\lambda_1$ should deviate by less than 0.01 from 0.30, i.e. the value of R. The same consideration applies to reading with radiation of wavelength $\lambda_2$. The marks not to be read should thus have almost the same reflection coefficient as their surroundings. The layer 1 should have such a chemical composition that the spectral sensitivity of the reflection coefficient satisfies these requirements. If the reading device simultaneously reads the two information planes by focusing radiation of the two wavelengths on the information plane, the radiation of the unwanted wavelength which, via the non-ideal dichroic mirror 26, still reaches a detection system not intended for this purpose should be incorporated as an extra interference signal in the interference requirement. The quality of the dichroic mirror is thus also decisive for the quality of the information signals generated during simultaneous reading.

FIG. 3C shows another embodiment of a record carrier 5 for use with the reading device of FIG. 3A. This embodiment has two separate information planes, each of which to be read by radiation of a different wavelength. It has the advantage that the materials constituting the two information planes can be optimized independently of each other and thus provide a greater freedom of design. The information planes 1 and 2 are separated by an intermediate layer 8 which may have a thickness of zero so that the two information planes are situated directly on each other. Such a record carrier with an intermediate layer thickness of 2 μm is known in principle from FIG. 1 of said German Patent Application no. 37 41 910. However, this Patent Application does not state the value of the wavelength sensitivity of the reflections in relation to the properties of the detection circuit in the reading device so as to satisfactorily read the information in this record carrier. The interference requirement in accordance with the present invention, given in equation (2a), furnishes the required relations between the parameters which are necessary for the design of the information storage system. To obtain a maximum possible information density, the distance between the information planes should be chosen to be as small as possible, preferably of the order of or smaller than the wavelength of the radiation beam. In spite of such a small intermediate distance, the interference requirement can be satisfied by a correct choice of the wavelength dependence of the reflections.

The consequences of the interference requirement for the record carrier shown in FIG. 3C will now be explained with reference to FIG. 3D in which the reflection of a ray 33 of the read beam on the information planes 1 and 2 is shown. In the case to be considered information plane 2 is read with radiation of wavelength $\lambda_2$ and the permissible interference caused by information plane 1 should be determined. The electric field of the incoming ray 33 in FIG. 3D has an amplitude a. The amplitudes of the rays reflected by the information planes 1 and 2 represented by rays 34 and 35, are a $\sqrt{R_1}$ and a $T_1\sqrt{R_2}$, respectively, in which $R_1$ and $T_1$ are the intensity reflection and transmission coefficients of information plane 1 and $R_2$ is the intensity reflection coefficient of information plane 2, while all coefficients apply to wavelength $\lambda_2$.

The power of the read signal generated by the information plane 2 is determined, inter alia, by the power of the zero-order and higher-order diffraction beams reflected by the information plane. Since the amplitude of the beam incident on the information plane 2 is equal to a $\sqrt{T_1}$, the amplitude of the zero-order diffraction beam formed by information plane 2 is equal to a $\sqrt{T_1 R_2}$ and the amplitude of the higher-order diffraction beams is equal to a $\sqrt{T_1 R_2}m_2$. In this case it has been assumed that the power in the higher-order beams is small as compared with the power in the reflected and transmitted beams. If the information plane 1 were only to transmit and not reflect radiation, the zero-order and higher-order beams would interfere on the detector after transmission by the information plane 1 and would yield a read signal proportional to $a^2 m_2 T_1^2 R_2$. However, the beam 34 reflected by the information plane 1 should be added to the zero-order beam coming from the information plane 2. If the distance between the information planes is much smaller than $\lambda_2$, the amplitudes of the zero-order beam 34 and the beam 35 may be added together to give constructive interference. The sum of the zero-order beam of the information plane 2 and the beam 34 now interferes on the detector with the higher-order diffraction beams formed by the information plane 2. This yields the following read signal $S_r$ at the out put of the detector:

$$S_r = aT_1\sqrt{R_2}\, m_2(aT_1\sqrt{R_2} - a\sqrt{R_1}) \quad (6)$$
$$= a^2 m_2(T_1^2 R_2 - T_1\sqrt{R_1 R_2}).$$

This expression is now equal to $E_i m_i$ with i=2 in the denominator of the interference requirement given in equation (2a).

When the information plane 2 is being read, the information plane 1 is an interference plane giving an interference signal. In the embodiment of the record carrier shown in FIG. 3D, the information plane 1 is a phase structure comprising a partially reflecting layer provided with a relief between two transparent layers of equal refractive indices. Such an information plane generates diffraction beams in reflection only. An incident radiation beam 33 with an amplitude a reflected from the information plane 1 not only yields a zero-order diffraction beam 34 with an amplitude a$\sqrt{R_1}$ in reflection, but also higher-order diffraction beams with an amplitude a$\sqrt{R_1}$ $m_1$. If the information plane 2 were not present, these zero-order and higher-order beams would interfere on the detector and yield an interference signal in the detector signal which is proportional to $a^2 m_1 R_1$. The factor $m_1$ is thus the modulation factor of the detection signal generated by the information plane 1 in the absence of other information planes. Due to the presence of the information plane 2, the zero-order beam 34 of the information plane 1 is intensified with the beam 35. The sum of the beams 34 and 35 now interferes on the detector with the higher-order diffraction beams formed by the information plane 1.

This yields the following interference signal at the output of the detector:

$$E_1 m_1 = a^2 m_1(R_1 + T_1\sqrt{R_1 R_2}). \quad (7)$$

With a comparable frequency content of the two information planes and the same modulation transfer function, the interference requirement (2a) will be:

$$\frac{m_1(R_1 + T_1\sqrt{R_1 R_2})}{m_2(T_1^2 R_2 + T_1\sqrt{R_1 R_2})} < Q. \quad (8)$$

At customary values of $R_1$, $T_1$ and $R_2$ of 0.1, 0.8 and 0.4, respectively, the modulation factors should now comply with $$\frac{m_1}{m_2} < 1.60\ Q. \quad (9)$$

The modulation factor $m_1$ can be rendered small by choosing the double-pass phase depth of the phase structure in the information plane 1 for the wavelength $\lambda_2$ to be approximately equal to $2\pi$, as is apparent from said book "Principles of Optical Disc Systems". However, the phase depth should be such that there is a large modulation factor on reading the information plane 1 with radiation of the wavelength $\lambda_1$ requiring the phase depth to be different from $2\pi$. The ratio between the modulation factors in equation (9) can be rendered more favourable by increasing the reflection $R_2$. To be able to read the information plane 1 also satisfactorily, $R_1$ and $R_2$ are preferably wavelength-dependent due to the choice of the material of the information planes. At the wavelength $\lambda_1$, $R_1$ should then be large and R, should be small, and vice versa at $\lambda_2$. If the interference requirement is difficult to meet with the available materials for the information planes, the interference signal of the information plane 1 may be further reduced by increasing, for example the distance between the two information planes so that the modulation transfer function of the interference planes will be smaller.

A reasoning analogous to the foregoing may be given for reading the information plane 1 with radiation of the wavelength $\lambda_1$. In the embodiment of the record carrier shown in FIG. 3D, the information plane 1 does not form any higher-order diffraction beams in transmission. In record carriers which do form such beams, the expressions (6) to (9) should be adapted.

The examples mentioned hereinbefore indicate how the parameters of the record carrier must be determined in simple cases so as to comply with the interference requirement. In more complicated cases, particularly those in which the intermediate layer 8 has a thickness of the order of the wavelength, the computation may be performed in an analogous manner, in which phase jumps at optical transitions, phase rotations in the layers and multiple reflections between the transitions must be taken into account in known manner. However, this computation will then be largely numerical and will not have the formulary simplicity shown hereinbefore. The above arguments can also be applied to record carriers in which marks generate higher harmonics of the radiation used for reading the marks.

A second possibility of reducing the interference signals is to make use of a reading device with different detection moth for the different information planes provided with different information structures. An example is an information storage system in which the information in the record carrier is stored in the form of a magnetic domain structure as well as a pit structure, each being read in a specific detection mode adapted to the structure. Such an information storage system comprising a record carrier 5 and a reading device 6 is shown in FIG. 4A. A radiation source 11 in the reading device supplies a radiation beam which is passed via a, for example partially polarizing, beam splitter 25 to an objective system 14 and focused by this system on an information plane of the record carrier 5. The beam reflected by the record carrier is incident via the beam splitter 25 on a beam splitter 36 which splits the beam into two sub-beams having mutually perpendicular directions of polarization. The two sub-beams are incident on separate detectors 37 and 38 whose outputs are connected to a circuit comprising a differential amplifier 39 and a summing amplifier 43. The two detectors each convert the radiation of the incident sub-beam into an electric signal. The differential amplifier 39 forms a detection signal 40 which is the difference of the two electric signals. The summing amplifier 43 forms a detection signal 44 which is the sum of the two electric signals. Each of the detection signals 40 and 44 is converted by detection circuits 41 and 45 into information signals 42 and 46, respectively. The components 37, 38, 39 and 43 jointly constitute a detection system.

FIG. 4B shows a part of the record carrier 5 in a cross-section. The record carrier has two information planes, an information plane 1 in which the information is stored in pits formed in the subjacent substrate 7 and an information plane 2 in which the information is stored in magnetic domains formed in a magnetizable layer. The information planes may be separated from each other by an intermediate layer 8, as is shown in the Figure, but they may also coincide. If the scanning beam 32 is focused on the information plane 1, as is shown in the Figure, the beam will be modulated by the pits. The resultant power modulation of the reflected beam is detected in accordance with a first detection mode, i.e. electric signals supplied by the detectors 37 and 38 are added by the summing amplifier 43, at which a pit detection signal 44 is obtained. If the scanning beam 32 is focused on the information plane 2, the beam will be modulated due to the changing states of magnetization. The resultant polarization modulation of the reflected beam is detected in accordance with a second detection mode. i.e. the electric signals supplied by the detectors 37 and 38 are subtracted from each other by the differential amplifier 39, at which a domain detection signal 40 is obtained.

For an information storage system in which the two information planes coincide, the interference requirement for reading the domains follows from equation (2a) with $E_1=E_2$. The modulation transfer functions MTF in the interference requirement must be determined in the second detection mode, i.e. for the transmission of the modulations in the radiation from the record carrier to the detection signal 40. The transfer function for the modulation generated by the pit structure in the information plane is in this case equal to the product of an attenuation factor Z and the transfer function for the modulation generated by the pit structure. The factor Z is the ratio of the modulation in the domain detection signal 40 due to pits which have unwantedly been read and the modulation in the pit detection signal 44 due to the same pits. The pits generate electric signals in the detectors 37 and 38 with principally have the same shape, and the domain detection signal 40 supplied by the differential amplifier 39 should be zero. The fact that the domain detection signal 40 is not equal to zero is caused by small deviations in the record carrier 5, in the optical path from the record carrier to the detectors 37 and 38 and in the electronic circuit in the detection system. A domain detection signal 40 generated by the pits will, however, be considerably weaker than the pit detection signal 44 generated by the pits at the output of the summing amplifier 43. If the information contents of the pits and the domains are comparable and both types of marks, if read in their own detection mode, generate an equally strong read signal in their own detection mode, the interference requirement can be written as $$Z < Q. \quad (10)$$

Q is the interference ratio for the detection circuit 41. Equation (10) supplies the requirement for the record carrier and the optical system of the reading device in order to suppress the pit information in the second detection mode for the domains. If this requirement is satisfied, the influence of the pits will be sufficiently small when reading the domains in the second detection mode.

The interference requirement (2a) for reading the information plane 2 in FIG. 4B in an information storage system in which the information planes in the record carrier do not coincide is $$\frac{E_1 \sum_f m_1(f) \, MTF(f, d/n)}{E_2 \sum_f m_2(f) \, MTF(f, 0)} < Q. \quad (11)$$

The power in the beams coming from the two information planes is determined by the reflection and transmission coefficients of the two planes. If the thickness d of the intermediate layer 8 between the two information planes is larger than the depth of field of the objective system 14, the radiation reflected by the information plane 2 will not have a large influence on the interference signal generated by the information plane 1 when this information plane 1 is being read, which is in contrast to the record carrier shown in FIG. 3C in which this influence makes itself felt due to the small distance between the information planes. The power in the radiation reflected by the record carrier and received by the detection system is then equal to the sum of the powers of the radiations reflected by the separate information planes. The ratio of the power in the radiation reflected by the two information planes is thus given by $$\frac{E_1}{E_2} = \frac{R_1}{T_1^2 R_2}. \quad (12)$$

The transfer function MTF(f,0) of the modulation generated by the information plane 2 is equal to the known modulation transfer function for an incoherently illuminated system. The transfer function for the modulation generated by the interference plane 1 is a defocused transfer function of the modulation generated by the information plane 1 located outside the focus and multiplied by the above-mentioned attenuation factor Z.

The interference requirement (11) can now be written as $$\frac{R_1 \sum_f m_1(f) Z \, MTF_1(f, d/n)}{T_1^2 R_2 \sum_f m_2(f) \, MTF(f, 0)} < Q \quad (13)$$

in which the index 1 of $MTF_1$ indicates that the modulation transfer function must be determined in the first detection mode, while the use of the second detection mode for reading the information plane 2 is taken into account with the factor Z. At a given configuration and parameters of the record carrier, the requirements can now be imposed on the reading device as regards the interference ratio Q and the separation between the detection signals 40 and 44, expressed as a requirement for Z. On the other hand, at given values of Q and Z, the parameters of the record carrier can be determined. In an information storage system having such a thickness of the intermediate layer 8 that the ratio of the modulation transfer function $MTF_1$ and MTF is equal to 0.15, and for which it further holds that: Q=0.03, Z=0.033, $m_1=m_2$, $R_2=0.3$ and $T_1=1-R_1$ (i.e. a negligible radiation absorption in the information plane 1), the reflection coefficient $R_1$ of the information plane 1 should be smaller than 0.48 in order to comply with the interference requirement (13). Starting from given values of Q, Z, $R_1$, $R_2$, $m_1$ and $m_2$, the maximum ratio for the transfer functions $MTF_1$ and MTF can also be determined by means of equation (13). The minimum distance between the information planes at which the information can still be read satisfactorily follows therefrom. When the minimum distance is used, the record carrier 5 has the largest information density.

In a comparable manner the interference requirement can be given for reading the information plane 1 with the pit structure in the first detection mode. The pit detection signal 44 generated by the information plane 1 has a DC value and an AC value. It is therefore generally detected in the detection circuit 45 in the way as described with reference to FIG. 2. The detection level D is then at the DC value of the detection signal. The presence of radiation coming from the information plane 2 in the record carrier not only leads to an unwanted modulation of the pit detection signal 44, but also to an offset of the DC value. This offset may in turn lead to an unreliable detection of the modulation generated by the information plane to be read. The allowed offset, at which detection can still be performed reliably, can be expressed in a DC interference requirement. The AC interference requirement then provides the allowed AC interference signal of the information plane 2. The offset may be expressed as a fraction of the amplitude of the modulation of the pit detection signal 44 or as a fraction of the DC value. In the latter case the DC interference requirement is given by equation (3). If the powers of the beams satisfy the equation (12), the DC interference requirement can be written as $$\frac{T_1^2 R_2}{R_1} MTF_1(0, d_j/n) < Q_{DC}. \tag{14}$$

The modulation transfer function indicates how much radiation of the information plane 2 which is out of focus, is received by the detection system. This quantity can be reduced considerably by performing a detection known as confocal detection. For an information storage system having such a thickness d of the intermediate layer 8 and such a configuration of the detection system that $MTF_1=0.15$ and the DC interference ratio Q=0.05, $R_1$ must be larger than 0.36 if $R_2=0.3$. In combination with the interference requirement computed hereinbefore for reading the information plane 2, it follows that the intensity reflection coefficient of the information plane 1 should have a value of between 0.36 and 0.48.

FIG. 5A shows a record carrier 5 for reading the information in reflection, in which the interference requirement leads to special requirements to be imposed on the parameters of the record carrier. The record carrier has three information planes, numbered 1, 2, 3 from the side where the radiation beam 32 from the objective system (not shown) enters the record carrier. Two intermediate layers having thicknesses $d_1$. and $d_2$ are provided between the information planes 1 and 2, and 2 and 3, respectively. The Figure shows the situation where the information plane 3 is read by means of the radiation beam 32. The radiation reflected by the information plane 2 forms a converging beam 50, denoted by broken lines, in the direction of the information plane 1. If the intermediate layers have the same thickness, this converging beam will focus on the information plane 1. A part of the radiation in the converging beam will be transmitted by the information plane 1 and form a diverging beam 51 which is received by the objective system. Another part will also return to the objective system after further reflections from the information planes 1 and 2. Consequently, a part of the radiation beam returning in the objective system is focused on the information plane 3 to be read and simultaneously another part is focused on the interference plane 1. The radiation of beam 50 reflected from the information planes 1 and 2 will thus generate a large interference signal. The beam 51, transmitted by the information plane 1, is far out of focus for the objective system and will generally give a much smaller interference signal than the beam reflected from the information plane 1. The interference requirement (2a) for reading information plane 3 is then:

$$\frac{T_1^2 R_2 \sum_f m_2(f) MTF(f, d_2/n) - T_1^2 R_2^2 R_1 \sum_f m_1(f) MTF(f, (d_1-d_2)/n)}{T_1^2 T_2^2 R_3 \sum_f m_3(f) MTF(f, 0)} < Q, \tag{15}$$

in which the first term above the bar of division is the interference signal generated by the information plane 2 and the second term is the interference signal generated by the information plane 1. The second term can be considered as the interference signal generated by an imaginary information plane formed by mirroring of the information plane 1 with respect to the information plane 2. The imaginary information plane has the distance $(d_1-d_2)$ to the information plane 3 to be read and an effective reflection coefficient $R_1(T_1R_2)^2$.

If $d_1=d_2$, as shown in FIG. 5A, the imaginary information plane coincides with the information plane 3. The modulation transfer function in the second term of equation (15) then has the focused value and is thus relatively large. In such a case the first term in equation (15) can generally be ignored. If the information or frequency contents and the modulation factors of the information planes 1 and 3 are comparable, the interference requirement (15) can be written as $$\frac{R_2^2 R_1}{T_2^2 R_3} < Q. \tag{16}$$

At equal values of the reflection coefficients and a negligible absorption in the information planes, the reflection coefficient should be smaller than 0.15 so as to satisfy an interference requirement with Q=0.03. In a record carrier having equal distances between the information planes, the information planes should thus not have too high a reflection coefficient. However, the information plane which is furthest remote from the objective system, i.e. the information plane 3 in FIG. 5A, may have a high reflection coefficient.

A record carrier with three information planes must comply with three interference requirements, one for reading each of the planes, thereby reducing the design ranges for the parameters of the record carrier. The designer of the record carrier shown in FIG. 5A has more freedom if he gives the intermediate layers 8 and 9 different instead of equal thicknesses. This results in a decrease of the value of the modulation transfer function in the second term of equation (15) so that the strength of the interference signal generated by the information plane 1 is reduced. A large degree of freedom in the choice of the values of the parameters of the record carrier is obtained when the ratio of the optical thicknesses i.e. din of the intermediate layers is larger than 1.5. In order to maintain a high information density, the ratio should be smaller than 3, and, preferably, smaller than 2. The lowest interference signals are obtained when the thinner intermediate layer is closer to the entrance face of the record carrier through which the radiation beam 32 enters the record carrier than the thicker intermediate layer.

In a record carrier having more than three information planes, attention should be paid during design to the positions of all imaginary information planes resulting from reflections. If an imaginary information plane coincides, after two or more specular reflections on other information planes, with an existing information plane, this will generally not lead to inadmissibly large interference signals because the strength of the interference signals rapidly decreases at an increasing number of reflections of the radiation on information planes. A multiplane record carrier can therefore often be realised satisfactorily by alternately placing a thicker and a thinner intermediate layer between the information planes, as shown in FIG. 5B. The thickness of a single intermediate layer is then determined by the interference requirement for the two information planes at both sides of the intermediate layer. The difference in thickness between two consecutive intermediate layers follows from the interference requirement (15). The record carrier shown in FIG. 5B can easily be made by stacking thin transparent sheets of equal thickness, with an information plane on each side of a sheet, and with a spacer of air or a transparent material in between the sheets.

The quantity of radiation detected from an information plane read in reflection is dependent, inter alia on the transmission of the information planes lying between the information plane to be read and the objective system. Generally, the power of the read signal generated by the information plane to be read will therefore decrease with an increasing distance of this information plane to the objective system. However, for a multiplane record carrier the power of the read signal of the different planes j, in which the value of j increases with an increasing distance to the objective system, can be maintained at a constant value if the condition $$R_{j+1} = \frac{r_j}{T_j^2} \tag{17}$$

is satisfied. For a four-plane record carrier with an ideal reflector for the fourth information plane and without absorption in the information planes, this leads to $R_1=0.16$, $R_2=0.23$, $R_3=0.38$ and $R_4=1.00$.

The modulation transfer function MTF occurring in the interference requirement is dependent on the optical parameters of the reading device. Before giving an expression for the MTF, the parameters occurring therein will be dealt with first. The MTF is dependent, inter alia on the wavelength $\lambda$ of the radiation with which the record carrier is read and on the numerical aperture (NA) of the objective system 14 at the side of the record carrier. These parameters determine the highest frequency which is still transmitted by the objective system, i.e. the highest spatial frequency of the marks which can still be read separately. The highest transmitted frequency for a normal coherently illuminated optical system, referred to as the cut-off frequency, is given in terms of spatial frequencies by $$f_c = \frac{NA}{\lambda}, \tag{18}$$

or, in terms of temporal frequencies, by $$f_c^t = \frac{NA}{\lambda}v, \tag{19}$$

in which v is the velocity at which the spot scans the information plane. The highest transmitted frequency for the reading device is equal to $2f_c$. The frequencies present in the information stored in the information planes and in the detection signals can be represented by the dimensionless parameter $\omega$, with $$\omega = \frac{f}{f_c}. \tag{20}$$

Likewise, the distance d between the information planes can be given in terms of the depth of field of the object system $$\xi = \frac{2dNA^2}{\lambda}. \tag{21}$$

When determining the interference requirement, the distance between the information plane to be read and an interference plane is equal to the defocusing. Hence, the parameter $\xi$ is a measure of the defocusing of an information plane with respect to the spot with which the information in the record carrier is read. The dependence of the modulation transfer function on the size of the detection system 15 can be described by means of the parameter $\eta$, given by $$\eta = \frac{r_d}{2MNAd}. \tag{22}$$

Here, $r_d$ is the effective radius of the detection system. If no diaphragms are arranged in the radiation beam in front of the detection system, the effective radius is equal to the radius of the radiation-sensitive surface of the detection system. If a diaphragm has been arranged, for example at a point of convergence of the radiation beam just in front of the detection system, as is common practice for confocal detection, the effective radius is equal to the radius of the diaphragm. The parameter M in equation (22) is the magnification of the optical system from the record carrier 5 to the detection system 15. The optical system in the device shown in FIG. 1 comprises the objective system 14 and the collimator lens 13.

The information in the information planes will often be ordered in tracks. The dependence of the modulation transfer function on the period q of the tracks is expressed in the dimensionless parameter κ as follows $$\kappa = \frac{qNA}{\lambda}. \tag{23}$$

The direction parallel to the tracks and in the information plane is denoted by the subscript t of tangential in the following equations. The direction perpendicular to the tracks and in the information plane is denoted by the subscript r of radial.

The modulation transfer function for a record carrier read in reflection can be written in the following way as the product of a tangential modulation transfer function $MTF_t$ and a radial function $F_r$.

$$MTF(f,d) = MTF_t(f,d) F_r(q,d). \tag{24}$$

The tangential modulation transfer function is given in dimensionless parameters by $$MTF_t(\omega, \xi) = \frac{2}{\pi} \int_S \int d\beta\, d\epsilon\, \cos(\pi\xi\beta\omega). \tag{25}$$

The parameter d should be replaced by d/n if the refractive index of the intermediate layers of the record carrier is not equal to 1. Dependent on the size of the detection system, the integration area S is equal to $$0 < |\beta| < 1 - \frac{\omega}{2},\ 0 < \epsilon < \sqrt{1 - \left(|\beta| + \frac{\omega}{2}\right)^2}\ \text{if}\ \eta > \sqrt{1 - \left(\frac{\omega}{2}\right)^2}, \tag{26}$$

$$0 < |\beta| < \eta,\ 0 < \epsilon < \sqrt{\eta^2 - \beta^2}\ \text{if}\ \eta < 1 - \frac{w}{2}\ \text{and} \tag{27}$$

the area of overlap of said two areas if $1 - \frac{\omega}{2} \leq$ \tag{28}

$$\eta \leq \sqrt{1 - \left(\frac{\omega}{2}\right)^2}$$

In the case of a large radiation-sensitive surface of the detection system the integration is over the area of overlap of the zero-order and higher-order diffraction beams incident on the detection system (integration area given by equation (26)); in the case of a small radiation-sensitive surface the integration within the area of overlap is only over the surface of the detection system (integration area given by equation (27)). It is apparent from equations (26), (27) and (28) that the parameter ω, i.e. the frequency contents of the information plane, also determines whether the radiation-sensitive surface is regarded as large or small. If the sensitive surface is smaller than the image of the spot on the detection system, there is confocal detection. In dimensionless parameters this corresponds to η<1/(2ξ). In the case of confocal detection the value of the modulation transfer function very rapidly decreases with an increasing defocusing ξ. Information planes not to be read then produce only small interference signals. Consequently, the distance between the information planes can be further reduced than is possible without confocal detection, which enhances the information density of the record carrier. The tangential modulation transfer function for a large detection system is equal to the modulation transfer function of an incoherently illuminated imaging system as is known, inter alia from the article "The defocused image of sinusoidal gratings" by W. H. Steel n Optica Acta, vol. 3, no. 2, June 1956, pp. 65-74.

The radial function $F_r(q,d)$ in equation (24) is given in dimensionless parameters by $$f_r(\kappa, \xi) = \mathrm{sinc}\left(\frac{\xi^2}{1,8}\right)\ \text{if}\ \xi < 2, 1\ \text{and} \tag{29}$$

$$= \frac{\left(1 + \frac{\sqrt{\pi}\,\xi}{2\kappa}\right)^{\frac{1}{2}}}{4\xi}\ \text{if}\ \xi \geq 2, 1. \tag{30}$$

The function sin c(x) is defined as sin(x)/x. The radial factor $F_r$ is based on the fact that the information in the track to be read and the information in adjacent tracks are not correlated in phase. The modulation transfer function is normalized at zero frequency and zero defocusing for an infinitely large detector. Theoretically, the modulation transfer function locally has deep and sharp minimum values as a function of the defocusing ξ. However, these minimum values only occur with information planes in which only a single pure frequency occurs. In most cases the information will have a spectrum of frequencies so that the minimum values will not occur in the modulation transfer function. For determining the modulation transfer function the envelope of the function defined in equation (24) will then preferably be taken.

The envelope of the above-mentioned equation (24) for the modulation transfer function is in good conformity with the measured transfer function of an information storage system. FIG. 6 shows by way of example the modulation transfer function as a function of the dimensionless defocusing; for the parameter values ω=0.6, κ=1 and η large. The curve is normalized at zero defocusing, i.e. 20 $^{10}$ log [|MTF(0.6, ξ)|/ MTF(0,ξ)] is plotted along the vertical axis. The solid line indicates the value of equation (24), the broken line indicates the envelope. The value U of the envelope for ξ>2.5, again normalized at zero defocusing, is given in a good approximation by $$U(\omega, \xi) = 0.072 \left[\frac{1 + \frac{\sqrt{\pi}}{2\kappa}\xi}{\left\{\omega\left(1 - \frac{\omega}{2}\right)\right\}^3 \xi^5}\right]^{*\frac{1}{2}}. \tag{31}$$

It will now be described by way of example how the distance between the information planes required for a record carrier according to the invention can be derived with the aid of FIG. 6 which results from the inventive idea and from the insight on which this invention is based. An information storage system has a detection circuit with an interference ratio for interference signals generated by information planes which are not to be read currently of Q=0.01=−40 dB. The record carrier has two information planes with information coded in marks m the same way, with comparable frequency spectra and complying with equation (17). The lowest frequency in the spectrum of the information plane which is currently not read produces the largest crosstalk, because generally the value of the modulation transfer function decreases with increasing frequency. To attain a reasonable approximation of the interference signal, it is assumed that only the lowest frequency occurs in the spectrum. If this is a frequency with ω=0.6, FIG. 6 will give the associated modulation transfer function. The interference requirement amounts to finding the smallest value of ξ for which MTF (0.6,ξ)|MTF(0.6,0)<Q. The broken line in FIG. 6 of the envelope gives ξ=5.2 for −40 dB. It follows from equation (21), at a wavelength λ=0.8 µm and a numerical aperture NA=0.5 that d=8.4 µm. If various frequencies occur in a band of the spectrum, a weighted average of the MTF of this band should be determined. The minimum thickness of the intermediate layer between the two information planes applies to the case where the intermediate layer is air. If the intermediate layer has a refractive index of more than 1, for example n=1.5, d/n must be 8.4 µm, hence d must be 12.6 µm. Said thicknesses are the minimum thickness of the intermediate layer in which the information in the information planes can still be read satisfactorily, or in other words, the detection circuit 17 in the reading device can derive a reliable information signal $S_i$ from the detection signal $S_d$. At the minimum thickness the information density in the direction perpendicular to the information planes in the record carrier of the information storage system is maximal. If the thickness of the intermediate layer is larger than this value and one of the information planes is being read, the other information plane will cause an interference signal in the detection signal $S_d$, which interference signal is more than 40 dB below the level of the read signal.

The modulation transfer function for the zero frequency as used, for example for the DC interference requirement in equation (14) is given by $$MTF(0,d)=1 \text{ if } \eta \geq 1, \text{ and} \tag{32}$$

$$MTF(0,d)=\eta^2 \text{ if } \eta<1. \tag{33}$$

A value MTF=0.15 as used in the consideration following equation (14) can be realised with η=0.387. It follows from equation (22) that at a radius $r_d$=20 µm, a magnification M=10 and a numerical aperture NA=0.5 the defocusing or the thickness of the intermediate layer 8 should be 5.2 µm or more in this case.

The modulation transfer function for reading devices with a non-uniform intensity distribution over the radiation beam proximate to the objective system 14 and with optical aberrations can be determined by means of numerical methods as described, for example in said book "Principles of Optical Disc Systems" and in the book "Scanning Optical Microscopy" by T. Wilson and C. Sheppard (Academic Press, 1984) chapters 2, 3 and 4, and can subsequently be further used in conformity with equation (24) in the interference requirement (2a) or (2b).

The embodiments, hitherto described, of the information storage system according to the invention are adapted to detect radiation reflected by the record carrier. However, in principle, all above-described methods of satisfying the interference requirement are also applicable to information storage systems in which the radiation is detected which is transmitted by the record carrier. The consequences of the interference requirement for an information storage system operating in transmission are largely equal to those for an information storage system operating in reflection. FIG. 7A shows diagrammatically an information storage system operating in transmission. In the reading device 6' a radiation source 11 generates a radiation beam which is focused on an information plane of the record carrier 5' by a collimator lens 53 and an objective system 14. The radiation transmitted by the record carrier is collimated, for example by a collector lens 54 and focused on a detection system 15 by a further collimator lens 55. The detection system supplies a detection signal $S_d$ which is converted into an information signal $S_i$ by a detection circuit 17. For a correct operation of the reading device, the objective system 14 and the collector lens 54 should be centred on one and the same optical axis during reading, so that the components 11, 53, 14 on the one hand and the components 54, 55 and 15 on the other hand are to be moved by a common driving device for displacing the radiation beam in the radial direction on a round record carrier 5'.

FIG. 7B shows a cross-section of part of the record carrier and the radiation beam 32 focused on the information plane 1 of the record carrier. The power of the transmitted beam 56 is independent of the information plane on which the beam is focused. Hence, the power E of the radiation beam coming from an information plane is equal in the interference requirement (2a) or (2b) for all information planes, or $$E_j = E_i \text{ for all } j \text{ and } i. \tag{34}$$

The read signal or the interference signal in the detection signal $S_d$ generated by an information plane, is thus only dependent on the modulation generated by the relevant information plane in the transmitted radiation and is not dependent on the possibly different transmissions of the information planes or of the ordinal number of these planes. The interference requirement (2a) for reading the information plane i can be written as $$\frac{\sum_{j \neq i} \sum_f m_j(f) MTF^t(f, d_j/n)}{\sum_f m_i(f) MTF^t(f, 0)} < Q. \tag{35}$$

The interference requirement (2b) can be rewritten in the same way.

Likewise as the modulation transfer function of an information plane read in reflection, the modulation transfer function $MTF^t$ for an information plane read in transmission can be written as a product of a tangential modulation transfer function $MTF_t^1$ a radial function $F_r$:

$$MTF^t(f,d) = MTF_t^1(f,d) F_r(q,d). \tag{36}$$

The radial function is given in equations (29) and (30). In principle, the tangential modulation transfer function is known from said book "Scanning Optical Microscopy". If the numerical apertures of the objective system 14 and the collector lens 54 are equal, and if the optical aberrations are small, the tangential modulation transfer function can be written in dimensionless parameters as:

$$MTF_t^1(\omega, \xi) = \tag{37}$$

$$\frac{2}{\pi}\left[\arccos\left(\frac{\omega}{2}\right) - \frac{\omega}{2}\sqrt{1 - \left(\frac{\omega}{2}\right)^2}\right] * \frac{1}{\pi} \int_S \int d\beta d\epsilon \, \cos(\beta\omega - \pi\xi\omega^2)$$

$$\frac{J_1(\sqrt{\beta^2 + \epsilon^2}) J_1\left(\sqrt{(\beta + \pi\xi\omega)^2 + \epsilon^2}\right)}{\sqrt{\beta^2 + \epsilon^2}\sqrt{(\beta + \pi\xi\omega)^2 + \epsilon^2}}$$

with $J_1$ the first-order Bessel function and S being the area defined by $$-\sqrt{\zeta^2-\epsilon^2} < \beta < \sqrt{\zeta^2-\epsilon^2} \text{ and } -\zeta 2 1\epsilon < \zeta \tag{38}$$

The parameters ω and ξ are defined in equations (20) and (21), respectively. The parameter ζ is given by:

$$\zeta = \frac{2\pi NA r_d}{M\lambda} \tag{39}$$

and is the dimensionless radius of the image which is formed of the radiation-sensitive surface of the detection system 15 by means of the optical system with the components 55 and 54. The parameter M is the magnification of the optical system from the record carrier 5' to the detection system 15. The modulation transfer function is normalized at zero frequency and zero defocusing for an infinitely large detector.

The same methods as described for the record carrier read in reflection can be used to satisfy the interference requirement (35). An advantage of the record carrier suitable for reading in transmission is that the modulation transfer function as a function of the defocusing $\xi$ decreases more rapidly in value than the modulation transfer function for record carriers suitable for reading in reflection. Consequently, the information planes in the last-mentioned record carrier may be situated closer together than in the record carrier suitable for reading in reflection. A further advantage of reading in transmission is that imaginary information planes caused by mirroring on other information planes do not have much effect on the strength of the interference signals.

TABLE 1A

| | |
|---|---|
| (1) | $S_r = C \sum_f E_i m_i(f) \text{MTF}(f),$ |
| (2a) Claim 2 | $\dfrac{\sum_{j \neq i} \sum_f E_j m_j(f) \text{MTF}(f, d_j/n)}{\sum_f E_i m_i(f) \text{MTF}(f, 0)} < Q.$ |
| (2b) Claim 3 | $\dfrac{\left(\sum_{j \neq 1}\left(\sum_f E_j m_j(f) \text{MTF}(f, d_j/n)\right)^2\right)^{\frac{1}{2}}}{\sum_f E_j m_j(f) \text{MTF}(f, 0)} < Q.$ |
| (3) | $\sum_{j \neq i} \dfrac{E_j}{E_i} \text{MTF}(0, d_j/n) < Q_{DC},$ |

TABLE 1A-continued

| | |
|---|---|
| (4) | $\dfrac{m_2}{m_1} < Q.$ |
| (5) | $\left| \dfrac{\sqrt{R_2} - \sqrt{R}}{\sqrt{R_1} - \sqrt{R}} \right| < Q.$ |
| (6) | $S_r = \alpha T_1 \sqrt{R_2}\, m_2 \left(\alpha T_1 \sqrt{R_2} + \alpha \sqrt{R_1}\right)$ $= \alpha^2 m_2 \left(T_1^2 R_2 + T_1 \sqrt{R_1 R_2}\right).$ |
| (7) | $E_1 m_1 = \alpha^2 m_1 \left(R_1 + T_1 \sqrt{R_1 R_2}\right).$ |
| (8) | $\dfrac{m_1 \left(R_1 + T_1 \sqrt{R_1 R_2}\right)}{m_2 \left(T_1^2 R_2 + T_1 \sqrt{R_1 R_2}\right)} < Q.$ |
| (9) | $\dfrac{m_1}{m_2} < 1, 60 Q.$ |
| (10) | $Z < Q.$ |
| (11) | $\dfrac{E_1 \sum_f m_1(f) \text{MTF}(f, d/n)}{E_2 \sum_f m_2(f) \text{MTF}(f, 0)} < Q.$ |
| (12) | $\dfrac{E_1}{E_2} = \dfrac{R_1}{T_1^2 R_2}.$ |
| (13) | $\dfrac{R_1 \sum_f m_1(f) Z \text{MTF}_1(f, d/n)}{T_1^2 R_2 \sum_f m_2(f) \text{MTF}(f, 0)} < Q$ |

TABLE 1B

| | |
|---|---|
| (14) | $\dfrac{T_1^2 R_2}{R_1} \text{MTF}_1(0, d_j/n) < Q_{DC}.$ |
| (15) Claim 9 | $\dfrac{T_1^2 R_2 \sum_f m_2(f) \text{MTF}(f, d_2/n) + T_1^2 R_2^2 R_1 \sum_f m_1(f) \text{MTF}(f, (d_1 - d_2)/n)}{T_1^2 T_2^2 R_3 \sum_f m_3(f) \text{MTF}(f, 0)} < Q.$ |
| (16) Claim 10 | $\dfrac{R_2^2 R_1}{T_2^2 R_3} < Q.$ |
| (17) Claim 11 | $R_{j+1} = \dfrac{R_j}{T_j^2}$ |
| (18) | $f_c = \dfrac{NA}{\lambda},$ |
| (19) | $f_c^t = \dfrac{NA}{\lambda} v,$ |
| (20) Claim 12 | $\omega = \dfrac{f}{f_c}.$ |
| (21) Claim 12 | $\xi = \dfrac{2 d NA^2}{\lambda}.$ |

TABLE 1B-continued

| | |
|---|---|
| (22) Claim 12 | $\eta = \dfrac{r_d}{2MNAd}.$ |
| (23) Claim 12 | $\kappa = \dfrac{qNA}{\lambda}.$ |
| (24) Claim 12 | $MTF(f, d) = MTF_t(f, d) F_r(q, d).$ |
| (25) Claim 12 | $MTF_t(\omega, \xi) = \dfrac{2}{\pi} \int_S \int d\beta\, d\epsilon \cos(\pi \xi \beta \omega).$ |
| (26) Claim 12 | $0 < \|\beta\| < 1 - \dfrac{\omega}{2},\ 0 < \epsilon < \sqrt{1 - \left(\|\beta\| + \dfrac{\omega}{2}\right)^2}\ \text{if}\ \eta > \sqrt{1 - \left(\dfrac{\omega}{2}\right)^2},$ |
| (27) Claim 12 | $0 < \|\beta\| < \eta,\ 0 < \epsilon < \sqrt{\eta^2 - \beta^2}\ \text{if}\ \eta < 1 - \dfrac{\omega}{2}$ |

TABLE 1C

| | |
|---|---|
| (28) Claim 12 | $1 - \dfrac{\omega}{2} \leq \eta \leq \sqrt{1 - \left(\dfrac{\omega}{2}\right)^2}$ |
| (29) Claim 12 | $F_r(\kappa, \xi) = \mathrm{sinc}\left(\dfrac{\xi^2}{1,8}\right)\ \text{if}\ \xi < 2,\ 1$ |
| (30) Claim 12 | $= \dfrac{\left(1 + \dfrac{\sqrt{\pi}\,\xi}{2\kappa}\right)^{\tfrac{1}{2}}}{4\xi}\ \text{if}\ \xi \geq 2,\ 1.$ |
| (31) | $U(\omega, \xi) \approx 0.072 \left[\dfrac{1 + \dfrac{\sqrt{\pi}}{2\kappa}\xi}{\left\{\omega\left(1 - \dfrac{\omega}{2}\right)\right\}^3 \xi^5}\right]^{\tfrac{1}{2}}.$ |
| (32) | $MTF(0, d) = 1\ \text{if}\ \eta \geq 1,$ |
| (33) | $MTF(0, d) = 1\ \eta^2\ \text{if}\ \eta < 1.$ |
| (34) Claim 13 | $E_j = E_i$ |
| (35) | $\dfrac{\sum_{j \neq i} \sum_f m_j(f) MTF^l(f, d_j/n)}{\sum_f m_i(f) MTF^l(f, 0)} < Q.$ |
| (36) Claim 14 | $MTF^l(f, d) = MTF_t^l(f, d) F_r(q, d).$ |
| (37) Claim 14 | $MTF_t^l(\omega, \xi) = \dfrac{2}{\pi}\left[\arccos\left(\dfrac{\omega}{2}\right) - \dfrac{\omega}{2}\sqrt{1 - \left(\dfrac{\omega}{2}\right)^2}\right] *$ $\dfrac{1}{\pi}\int_S\int d\beta\, d\epsilon \cos(\beta\omega + \pi\xi\omega^2)\dfrac{J_1\!\left(\sqrt{\beta^2 + \epsilon^2}\right) J_1\!\left(\sqrt{(\beta + \pi\xi\omega)^2 + \epsilon^2}\right)}{\sqrt{\beta^2 + \epsilon^2}\ \sqrt{(\beta + \pi\xi\omega)^2 + \epsilon^2}}$ |
| (38) Claim 14 | $-\sqrt{\zeta^2 - \epsilon^2} < \beta < \sqrt{\zeta^2 - \epsilon^2}\ \text{and}\ -\zeta < \epsilon < \zeta.$ |
| (39) Claim 14 | $\zeta = \dfrac{2\pi NA r_d}{M\lambda}$ |

The invention claimed is:

1. An optical record carrier comprising a first information plane having an information structure which is optimally read in a first read mode and at least a second information plane having an information structure which is optimally read in a second read mode; each of said information planes storing information which is readable by a read device which scans the record carrier from one side thereof, which read device includes:
  (i) an optical system for focusing a radiation beam on a selected one of said information planes which is to be read;
  (ii) a detection system for receiving radiation from the record carrier resulting from the radiation beam and producing a detection signal based on the received radiation, which detection signal includes a read signal resulting from the information plane being read and one or more interference signals resulting from other of said information planes; and
  (iii) a read circuit for deriving from the read signal an information signal corresponding to the information stored in the information plane being read, said read circuit having an interference ratio Q associated therewith which is indicative of an operational characteristic thereof;
  the information planes being spaced at a distance from each other and having optical properties such that the ratio of the sum of said interference signals to the read signal is smaller than said interference ratio Q.

2. An optical record carrier as claimed in claim 1, wherein the first information plane has an information structure which is optimally read at a first wavelength, and the second information plane has an information structure which is optimally read at a second wavelength.

3. An optical record carrier as claimed in claim 2, wherein the first information plane has a higher reflection intensity for radiation of the first wavelength than for radiation of the second wavelength.

4. An optical record carrier as claimed in claim 3, wherein the information structure of the first and second information planes comprises marks and regions around the marks having optical properties such that $$\left| \frac{\sqrt{R_2} - \sqrt{R}}{\sqrt{R_1} - \sqrt{R}} \right| < Q$$

where R is the intensity reflection coefficient of a region, $R_1$ is the intensity reflection coefficient of the marks in the first information plane and $R2$ is the intensity reflection coefficient of the marks in the second information plane, the intensity reflection coefficients being determined at said first wavelength.

* * * * *